W. J. & A. F. PINE.
SELF LUBRICATING SPRING.
APPLICATION FILED SEPT. 29, 1916.
1,262,555.
Patented Apr. 9, 1918.
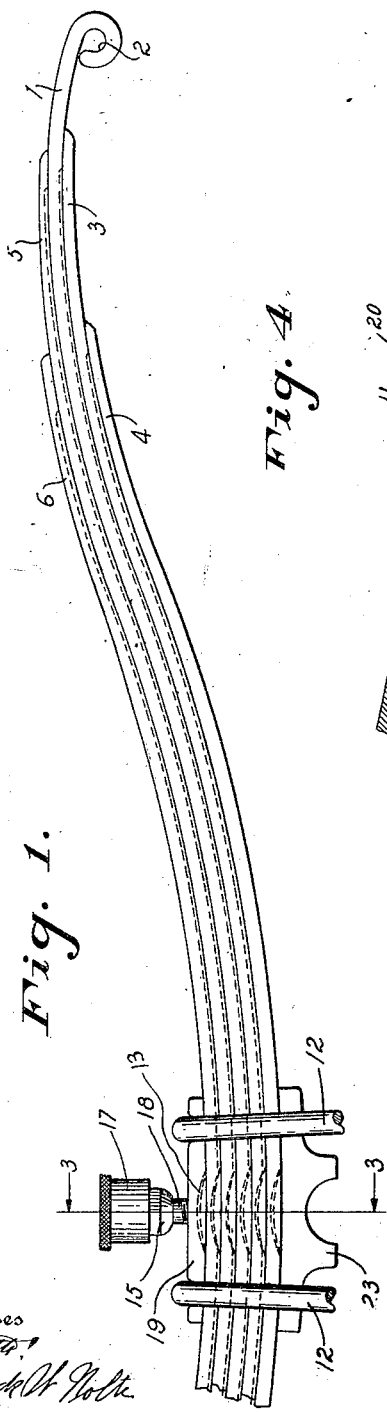
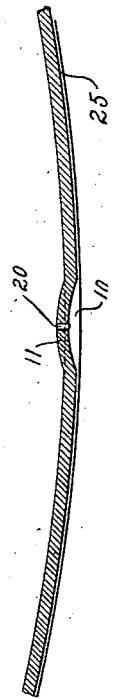
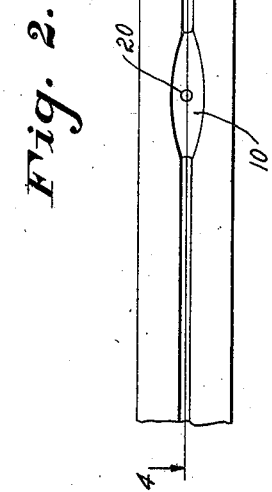

UNITED STATES PATENT OFFICE.

WILBER J. PINE, OF OSHKOSH, WISCONSIN, AND ARTHUR F. PINE, OF CASTLE ROCK, COLORADO.

SELF-LUBRICATING SPRING.

1,262,555.   Specification of Letters Patent.   Patented Apr. 9, 1918.

Application filed September 29, 1916. Serial No. 122,788.

*To all whom it may concern:*

Be it known that we, WILBER J. PINE and ARTHUR F. PINE, citizens of the United States, residing, respectively, at Oshkosh, county of Winnebago, and State of Wisconsin, and Castle Rock, county of Douglas, and State of Colorado, have invented new and useful Improvements in Self-Lubricating Springs, of which the following is a specification.

Our invention relates to improvements in self lubricating springs.

The object of our invention is to provide means whereby an adequate supply of lubricant may be maintained not only in a reservoir which supplies it to the several leaves of the spring, but also in a set of auxiliary reservoirs between the respective leaves of the spring, whereby proper distribution of the lubricant to all contacting faces of the spring leaves is assured.

In the drawings:

Figure 1 is a side elevation of a vehicle spring embodying our invention, with dotted lines indicating the auxiliary reservoirs and the distributing ducts, one end of the spring however being partially broken away.

Fig. 2 is a fragmentary view of one of the leaves as seen from the under side.

Fig. 3 is a cross sectional view, drawn on line 3, 3 of Fig. 1.

Fig. 4 is a longitudinal sectional view, (fragmentary) drawn on line 4, 4 of Fig. 2.

Like parts are referred to by the same reference numerals throughout the several views.

The main leaf 1 of our improved vehicle spring is provided with eyes 2 at its ends in accordance with the usual practice. This main leaf 1 is reinforced by auxiliary leaves 3 and 4 and 5 and 6 respectively. In the drawings the auxiliary leaves 3 and 4 are shown below the main spring and the leaves 5 and 6 above it, but we make no claim to this feature in the present application, and for the purpose hereof the arrangement of the auxiliary or reinforcing leaves may be regarded as following ordinary practice.

It will be observed, however, that the central portion of each leaf is provided with a longitudinal recess 10 on one side and a corresponding bulge 11 on the other side, preferably formed by longitudinally corrugating the leaf between the clamping clips 12, shown in Fig. 1. The bulging portion or side of each corrugation fits into the recess of the corrugation in the next leaf of the series, but does not project far enough to reach the base of the recess 10. Therefore a small cavity 13 is provided between the surface of each bulge 11 and the wall of the recess 10 which constitutes the base portion of the recess. The recesses 10 are preferably formed in the underside of each leaf and the bulging portions 11 are therefore on the upper side, but it is not essential to our invention, it being largely immaterial in which direction the leaves are corrugated. We prefer to bulge them upwardly the better to facilitate adequate distribution of the lubricant, as hereinafter explained.

A cup shaped reservoir 15 is adapted to receive a quantity of lubricant to which pressure may be applied by means of a cap 17 screwed upon or into the cup. The cup is provided with a shank 18 which is screwed into the upper member of the spring. This member comprising, in the construction shown, a clamping plate 19, having its under surface recessed to receive the upwardly bulging portion of the upper spring leaf 6. A feed duct 20 extends downwardly through the center of the respective leaves, and with the cavities 13 forms a continuous passage for the lubricant through the several leaves to the lower one. The lower leaf may also be perforated in case a bottom clamping plate 23 is employed.

It will be observed that the recesses 10 are substantially half oval in shape, tapering toward their respective ends and communicating at each end with a longitudinal groove 25, which extends outwardly toward the end of the spring in each case. The length of this groove is not material, except that we preferably do not extend it to the extreme end of the spring. We also prefer to have the groove terminate substantially at the point where flexion, under ordinary conditions, is sufficient to cause distribution of oil or other lubricant by reason of the movement of the leaves.

The shank 18 of the reservoir 15 is tubular and communicates directly with the several cavities 13 and ducts 20. Therefore by filling the reservoir with a suitable lubricant and screwing down the cap said lubricant may be forced into the respective cavities 13 from which it distributes with great uniformity over the rounded surfaces of the bulging portions 11 and outwardly in the grooves 25 and along the contacting faces of the leaves on each side of such grooves. The grooves, however, tend to form a path of least resistance for the lubricant, thereby preventing any strong tendency for the lubricant to force its way laterally to the exterior at the sides of the spring near the ends of the leaves where flexion is decided. Each leaf has a relative longitudinal movement with reference to the next leaf in the series during periods of flexion, and this also facilitates longitudinal and not lateral distribution of the lubricant.

We attach great importance to the provision of reservoirs between the respective leaves since these reservoirs are easily filled with the lubricant and furnish the direct source of supply for each leaf, thus insuring uniform distribution. We also attach considerable importance to the fact that each of these auxiliary reservoirs 10 is located at the summit of a somewhat conically shaped mound produced by the bulge of the corrugation. If, however, the direction of the corrugation be reversed or if the spring be inverted effective distribution of the lubricant may still be accomplished, particularly in view of the movement of the spring leaves upon each other, and by reason of the pressure exerted by the lubricant in the reservoir. We are aware that efforts have heretofore been made to provide spring leaves with oil distributing grooves, but so far as we are aware none of these efforts have been sufficiently successful to be commercially available. But by providing a series of auxiliary reservoirs with grooves leading therefrom along one side of each leaf and preferably following the center line thereof outwardly to a point where decided flexion occurs, we have succeeded in providing a structure where the distribution of the lubricant will be uniform, adequate and not excessive at any point. Our device is peculiarly adapted for the distribution of graphite or a mixture of graphite and oil, or any other heavy lubricant, the distribution of which is otherwise difficult to accomplish.

We claim:

1. A self lubricating spring, comprising a series of leaves, each provided with a longitudinal corrugation in its central portion, forming a recess on one side of the leaf and a bulge on the other side, which bulge is adapted to fit within the corrugation of the next succeeding leaf in the series, and to partially fill said corrugation, each leaf being provided with a passage leading to the cavity between the bulging portion of one leaf and the base of the recess in the next.

2. A self lubricating spring, comprising a series of leaves, each provided with a longitudinal corrugation in its central portion, forming a recess on one side of the leaf and a bulge on the other side, which bulge is adapted to fit within the corrugation of the next succeeding leaf in the series and to partially fill said corrugation, each leaf being centrally apertured to provide a lubricant passage communicating with said recesses, and a main reservoir adapted to feed lubricant through one of said apertures, whereby the same may be distributed to all of them and to said recesses.

3. A self lubricating spring, comprising a series of leaves, each provided with a longitudinal corrugation in its central portion terminating in grooves extending along one face of the leaf toward its respective ends, said leaves being each provided with an oil duct extending through its central portion.

4. A self lubricating spring, comprising a series of leaves, each provided with a longitudinal corrugation in its central portion terminating in grooves extending along one face of the leaf toward its respective ends, said leaves being each provided with an oil duct extending through its central portion, said corrugations comprising recesses on one side of the leaf and bulging projections on the other side, each interfitting with and partially filling a recess in the adjacent leaf, and said spring being provided with a superposed reservoir having a tubular shank in communication with said apertures and with the cavities between the recessed and bulging portions of adjacent leaves.

5. A self-lubricating spring, comprising the combination of a series of leaves, each provided with a central corrugation interfitting with an adjacent leaf and each having grooves leading outwardly from the concave side of the corrugation, and means for forcing lubricant into the spaces between the interfitting corrugated portions of said leaves.

In testimony whereof I affix my signature in the presence of two witnesses.

WILBER J. PINE.

Witnesses:
LEVERETT C. WHEELER,
JENNIE DONOVAN.

In testimony whereof I affix my signature in the presence of two witnesses.

ARTHUR F. PINE.

Witnesses:
BART W. HEISS,
JENNIE DONOVAN.